(12) United States Patent
Jiang et al.

(10) Patent No.: US 6,610,230 B2
(45) Date of Patent: Aug. 26, 2003

(54) METHOD OF MAKING MOLD USING ELONGATED METAL ELEMENTS

(75) Inventors: Jiaren Jiang, London (CA); Xing Yang Liu, London (CA); Millan Yeung, London (CA)

(73) Assignee: National Research Council of Canada, Ottawa (CA)

(*) Notice: Subject to any disclaimer, the term of this patent is extended or adjusted under 35 U.S.C. 154(b) by 60 days.

(21) Appl. No.: 09/954,051

(22) Filed: Sep. 18, 2001

(65) Prior Publication Data

US 2003/0042653 A1 Mar. 6, 2003

(30) Foreign Application Priority Data

Aug. 31, 2001 (CA) .............................. 2356438

(51) Int. Cl.⁷ .............................................. B29C 33/38
(52) U.S. Cl. ...................... 264/161; 264/225; 264/226; 264/227
(58) Field of Search .......................... 249/155; 264/219, 264/226, 101, 225, 227

(56) References Cited

U.S. PATENT DOCUMENTS

| | | | |
|---|---|---|---|
| 3,258,840 A | * 7/1966 | Hedgewick et al. | 264/219 |
| 3,596,869 A | * 8/1971 | Humphrey | 249/155 |
| 5,253,176 A | 10/1993 | Todoroki et al. | |
| 5,330,343 A | * 7/1994 | Berteau | 249/155 |
| 5,470,590 A | * 11/1995 | Brubaker et al. | 249/155 |
| 5,513,972 A | * 5/1996 | Schroeder et al. | 249/155 |
| 5,846,464 A | 12/1998 | Hoffman | |
| 5,914,081 A | 6/1999 | Shevchuk | |
| 6,354,561 B1 | * 3/2002 | Fahrion | 249/155 |

FOREIGN PATENT DOCUMENTS

| | | |
|---|---|---|
| EP | 0 412 891 B1 | 7/1996 |
| EP | 0 529 124 B1 | 11/1996 |
| JP | 61-47217 | 3/1986 |
| JP | 1-278567 | 11/1989 |
| JP | 1-317718 | 12/1989 |
| JP | 5-228552 A2 | 9/1993 |
| JP | 7-032087 A2 | 2/1995 |
| JP | 7-032368 A2 | 2/1995 |
| JP | 7-088919 A2 | 4/1995 |
| JP | 7-266341 A2 | 10/1995 |
| JP | 8-39193 A2 | 2/1996 |
| WO | WO 93/12170 A1 | 6/1993 |

* cited by examiner

*Primary Examiner*—Allan R. Kuhns
(74) *Attorney, Agent, or Firm*—Anissimoff & Assoc.; Hans Koenig

(57) ABSTRACT

A method of making a mold directly from the object to be molded is disclosed. The object is placed within a walled enclosure having a closed bottom and open top. A plurality of elongated metal rod elements is vertically introduced and packed into the enclosure in vertical contact with said object and side by side contact with one another. An infiltration agent, such as a liquid resin or metal, is introduced over the elongated metal rod elements and allow to permeate into the spaces between the rod elements. The mass consisting of the liquid infiltration agent and the elongated metal elements is allowed to solidify into a mold which is removed from the object.

25 Claims, 2 Drawing Sheets

METHOD OF MAKING MOLD USING ELONGATED METAL ELEMENTS

BACKGROUND OF THE INVENTION

1. Field of the Invention

The present invention relates in general to a method of rapidly making inexpensive and good quality fully dense resin or metal moulds which closely approximate the performance of moulds made entirely from metal.

2. Description of Prior Art

In the art of making moulds, important design and manufacturing criteria include high thermal conductivity, high accuracy, high strength, high wear resistance and hence improved tool life. Good quality prior art metal moulds adequately meet these criteria but are costly to manufacture and require long lead times. This fact is an impediment to the development of new products given modern manufacturing realities.

There is an emerging and particular need for rapidly making moulds to accommodate shortened product development cycles as well as to meet a variety of other challenges such as product variants, small production runs and prototyping. Naturally, costs need to be controlled and the quality of the moulds improved where possible and to a greater degree than before. There is accordingly a demand for inexpensive moulds which can be made quickly for use in trials, evaluations or final production.

Various methods and techniques are known for making moulds in a more timely manner. For example, resins are now used to make moulds. The liquid resin is poured into a suitable enclosure containing the pattern to be reproduced and allowed to harden resulting in a mould incorporating the obverse shape of the pattern. The disadvantages of these moulds include poor thermal conductivity, reduced thermal shock resistance, high thermal expansion, high shrinkage during hardening or curing of the resin, low strength and wear resistance, and hence low accuracy and short tool life.

To improve the performance of resin moulds, metal filled resins or polymers have been developed. In order, however, to obtain a significant improvement in the performance of these moulds, a high quantity or proportion of metallic powder in the resin mixture is required. This has the effect of increasing the viscosity of the liquid resin mixture thereby making it difficult to pour and degas.

In order to increase the thermal conductivity and therefore the cooling efficiency of resin moulds, a plurality of metal plates may be used which are placed in the mould enclosure prior to the pouring of the resin so as to be embedded in the body of the mould. The cooling plates may be provided with cooling lines for circulating coolant so as to improve the thermal conductivity of the mould. According to another technique, aluminium honeycomb or metal meshes are embedded in the mould body instead of cooling plates.

These mould making methods using resins are easy to use and adequately address the need for rapid and inexpensive moulds. However, the moulds have disadvantages. The thermal conductivity of resins is poor compared to metals by a factor of about 100 and they accordingly suffer to various degrees from poor thermal conductivity. A disadvantage, for example, of using metal filled resins is that the amount of metallic powders in the mixture is limited by the requirement of reasonable fluidity when pouring the mould. As well, since resins are poor conductors of heat the thermal conductivity of the mould remains inherently low. The relatively large shrinkage of the resin component during curing causes distortion of the mould. Thermal expansion of the mould during operations at elevated temperatures also affects the dimensional stability and life of the mould. Thus, although the incorporation of metal powders in the resin mixture improves the mechanical and thermal properties of these moulds, further improvements remain desirable.

Other prior art examples of rapidly making moulds include Selective Laser Sintering processes which use a laser beam to bond a resin coated metal powder layer by layer to form a mould. Another example is the 3D System Keltool process. In this process a slurry consisting of metal powders and a binder is poured into a silicone mould and allowed to harden. A mould made according to this process requires further heat treatment to remove the binder and to add strength to the mould. An additional disadvantage of these methods is shrinkage which is a significant factor in causing distortion, cracking and reducing accuracy of the mould.

Other methods of making moulds include the use of arrays of elongated elements, such as rods, bars or pins of various cross-sections which are axially adjusted with respect to one another to reproduce the pattern or shape to be moulded on the surface of the array. The recess so formed in the surface of the array becomes the mould when poured. Means to manipulate and axially adjust the rod elements include computer control.

This method is relatively complex to use and suffers from the disadvantage that the mould surface is only an approximation of the pattern. As such, the moulded part requires further machining. Another disadvantage of this type of mould is its reduced strength.

SUMMARY OF THE PRESENT INVENTION

It is therefore an object of the current invention to provide a mould and method of rapidly making a mould having improved qualities such as high thermal conductivity, low shrinkage, high accuracy, high strength, high wear resistance and improved life, which closely approximates the performance of a fully dense metal mould. According to a first aspect of the present invention there is provided a method of making an object having a surface which is an obverse copy of a surface pattern on a second object which comprises placing the second object within a walled enclosure having a closed bottom and open top and orientating the surface pattern on said second object to face upwardly within the enclosure; selecting a plurality of elongated metal rod elements each having a cross section and opposite ends; vertically introducing a sufficient quantity of elongated metal rod elements into said enclosure to fill and pack said enclosure, each said elongated metal element having one end in contact against said surface pattern or bottom, each said elongated metal element being in longitudinal abutment with adjacent elongated metal elements defining spaces therebetween; introducing an infiltration agent into said enclosure over said elongated metal elements and allowing said agent to permeate said spaces; allowing said agent to solidify into an object and separating said object comprising said plurality of elongated metal elements from said pattern and said enclosure.

According to another aspect of the present invention there is provided a method of making an object having a surface which is an obverse copy of a surface pattern of a second object as described above wherein said second object is made of a ceramic material; and wherein said infiltration agent is a molten metal; and wherein said elongated metal elements have a melting point which is higher than that of the metal infiltration agent.

According to yet another aspect of the present invention, there is provided a method of making a copy of an object having a surface pattern comprising placing said object within a walled enclosure having a closed bottom and open top and orientating said surface pattern on said object to face upwardly within the enclosure; pouring a ceramic slurry material into said enclosure and making a ceramic pattern object having a shaped cavity incorporating an obverse copy of the said surface pattern; selecting a plurality of elongated metal elements each having a cross section and opposite ends; vertically introducing a sufficient quantity of elongated metal rod elements to fill and pack said shaped cavity, each said elongated metal element having one end in contact against the surface of said shaped cavity, and each said elongated metal element being in longitudinal abutment with adjacent elongated metal elements defining spaces there between; introducing an infiltration agent into said shaped cavity and allowing said agent to permeate said spaces; and allowing said infiltration agent to solidify into a copy of said object and separating said copy from said ceramic pattern.

According to yet another aspect of the present invention the said infiltration material comprises a metal having a melting point which is lower than the melting point of the elongated metal rod elements and said step introducing said infiltration agent consists of placing the assembly into an oven or furnace to melt the metal.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Referring in particular to the Figures several embodiments of the invention are now described.

Figure 1:
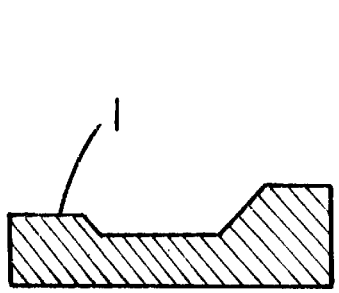
FIG. 1 is a schematic illustration pattern representing the shape of the part to be moulded.
Figure 2:
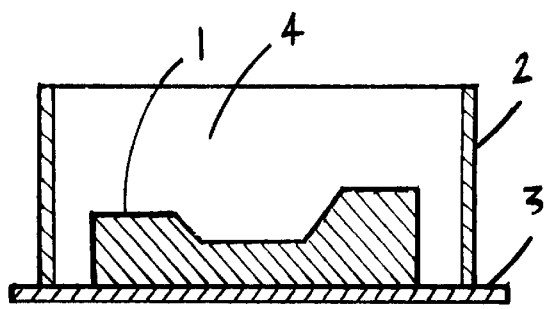
FIG. 2 is a schematic cross-sectional view of the pattern placed within an enclosure on a bottom plate.

According to one aspect of the present invention, a method of making a mould (11) starts with a reproduction of the shape to be manufactured called a pattern (1) which is schematically shown in FIG. 1. The pattern (1) is placed facing upwardly on a bottom plate (3) and is enclosed on all sides by a walled enclosure (2) surrounding the pattern (1) as shown in FIG. 2. As can be seen, a surrounding space or mould enclosure (4) is provided within the walls above the pattern (2) as further defined by the exterior perimeter surfaces of the pattern and the exposed portions of the bottom plate. The pattern (1) can be fabricated from any convenient material using either conventional methods or preferably using rapid prototyping methods or CNC machining. It should be noted that the term mould is used in its general sense for the purpose of illustration. The description applies equally to the manufacture of mould halves in which case a second pattern (not shown) will be used to make the complementary mould half (not shown) for the product to be manufactured.

Figure 3:
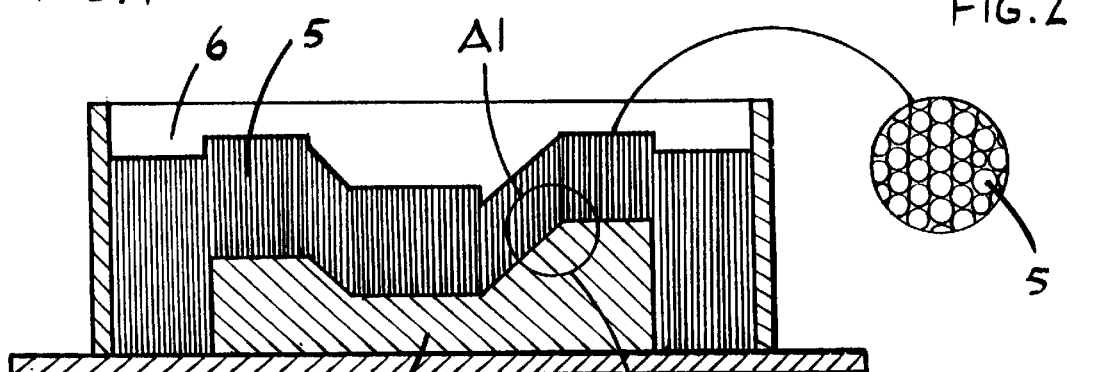
FIG. 3 is a schematic cross-sectional view illustrating the FIG. 2 assembly packed with elongated metal elements.

FIG. 3 illustrates the placement of elongated rod elements (5) having, in the example shown, a round cross section. Prior to doing so it is well understood to apply a mould release agent to all the interior surfaces within the mould enclosure (4) to later facilitate the removal of the hardened mould. The elongated metal elements (5) are vertically packed within the mould enclosure with the bottom ends in contact with the surface of the pattern and bottom of the enclosure. By means of this step it is intended to fill the mould enclosure (4) with the elongated metal elements and reproduce the reverse of the shape of the pattern (1) by means of upwardly displacing the elongated metal elements (5) against the pattern. The opposite ends of the elongated metal elements (5) extend upwardly into the mould enclosure (4) but preferably not above the top of the wall (2). An extra space (6) may thus be left in the mould enclosure above the elongated metal elements. A slight vibration may be applied to the assembly to improve the packing of the elongated metal elements within the mould enclosure and their contact with the surface of the pattern.

Figure 6:
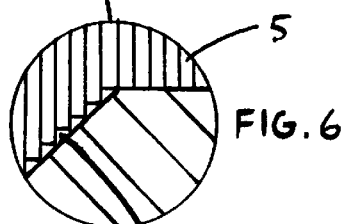
FIG. 6 is an enlarged sectional view of area A1 in FIG. 3
Figure 4:
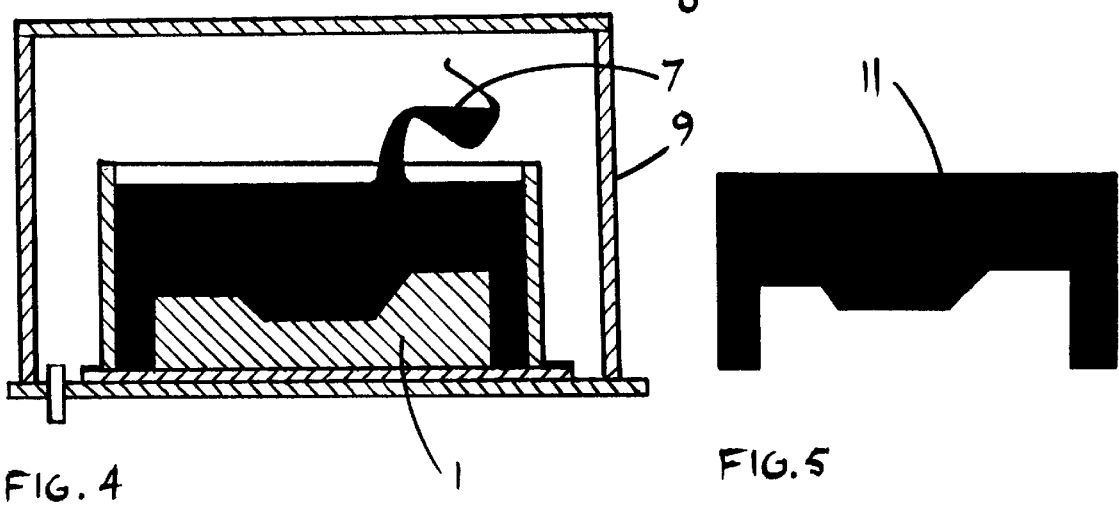
FIG. 4 is a schematic cross-sectional view illustrating the placement of the FIG. 3 assembly into a vacuum chamber and the pouring of the resin.
Figure 5:
FIG. 5 is a schematic cross-sectional view of the mould removed from the assembly prior to any machining steps.

An infiltration agent (7) such as a liquid resin is next poured over the packed elongated metal elements within the enclosure. The resin permeates into regular longitudinal spaces between adjacent elongated elements as well as between the irregular spaces (8) formed underneath the bottom ends of the elongated elements where the contact with the pattern is not flush as shown in FIG. 6. For the pouring step, the entire FIG. 3 assembly may be placed in a vacuum chamber 9 in order to facilitate the ingress of the resin into the regular and irregular spaces and to assist in degassing the polymer which is shown in FIG. 4.

The resin to be used can be either thermosetting or thermoplastic. A metal filled resin can also be used although the flowability of the resin may be significantly affected. After curing of the resin in the mould enclosure, the mould (10) so formed is separated from the pattern and may be machined as required to obtain any desired surfaces for subsequent installation on production equipment.

The elongated metal elements can be made from any suitable metal and can be made to any cross sectional shape and size depending on the performance requirements of the mould. To achieve improved thermal conductivity, copper and aluminium and their alloys may be used. If strength and wear resistance are of concern steel or a stronger metal and alloys may be used. The elongated elements can be cut to any desired length. Round or other regular cross sectional shapes such as square, triangle or hexagon are suitable.

Elongated metal elements having different cross-sectional size can also be selectively used in constructing the mould.

For example, thinner elements can be used in certain areas to better follow any critical surface gradients on the pattern while thicker elements may be used to follow relatively flat regions on the pattern. As well, thinner elongated elements can also be vertically inserted into the existing spaces between the thicker elements to increase packing density.

Neither is any specific restriction placed on the lengths of the elongated metal elements. For example, the ends of the elongated metal elements opposite to those in contact with the surface of the pattern may be longer or shorter than the height of the mould enclosure. Any protruding lengths can be easily machined after solidification of the mould. If elongated metal elements are used which are shorter than the height of the enclosure, the mould may be built up by pouring extra resin (11) into space (6) as shown in FIG. 3.

The mould thus obtained may be plated with metal such as nickel or chromium or the like to improve wear and corrosion resistance.

In another aspect of the present invention, the pattern may instead be first encased (not shown) in a thin metallic shell having the same shape as the pattern by any suitable means such as electroplating, spraying or precision casting. Removal of the mould from the pattern transfers the metal shell to the mould. In this way a mould having improved wear and corrosion resistance and good thermal conductivity is obtained.

Since the elongated metal elements are closely packed together the resin portion is low and shrinkage in the direction normal to the longitudinal axis is negligible. There is no effective shrinkage along the longitudinal axis of the elongated metal elements. The mould has improved accuracy and more precisely reproduces the pattern.

In all aspects of the invention, the infiltration agent may be either a resin, a metal filled resin or metal. When using a metal infiltration agent, the melting point of the elongated metal rod elements needs to be higher than the melting point of the infiltration agent.

According to yet another aspect of the present invention a metal infiltration agent may be used to make a fully dense metal mould that even more closely approximates a prior art metal mould. This aspect of the invention is now described with reference to FIGS. 7–13. Generally, a pattern is made from ceramic material such as a plaster or other refractory material such as zircon, silica, alumina in order to withstand the increased temperatures required to melt the metal agent. The elongated metal elements used for packing must have a melting point temperature higher than that of the metal infiltration agent to be used. The metal agent is placed over the packed elongated elements and the entire assembly is placed in a furnace at a temperature sufficient to melt the metal infiltration agent without melting the elongated metal elements. As a result a substantially metal mould is obtained.

Figure 7:
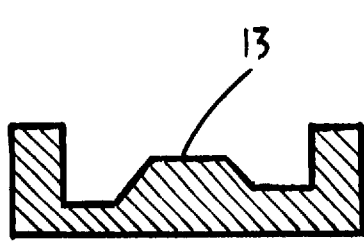
FIG. 7 is a schematic cross-sectional view illustrating a mould pattern.
Figure 8:
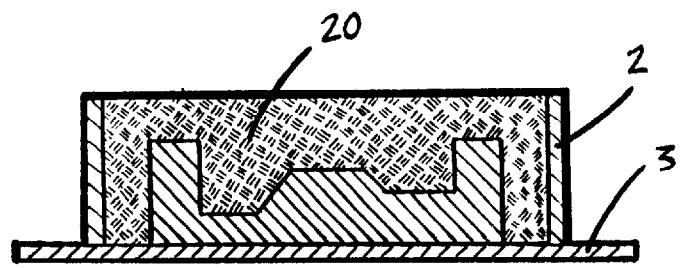
FIG. 8 is a schematic cross-sectional view illustrating the making of a ceramic reproduction of the mould pattern.
Figure 9:
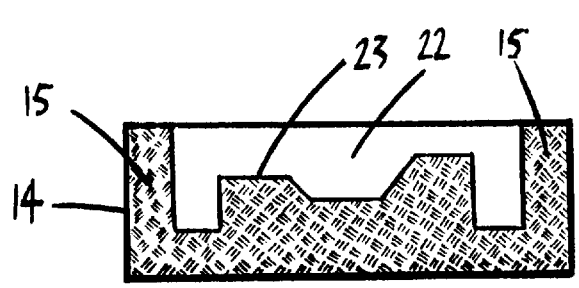
FIG. 9 is a schematic cross-sectional view of the ceramic reproduction of the mould pattern.
Figure 10:
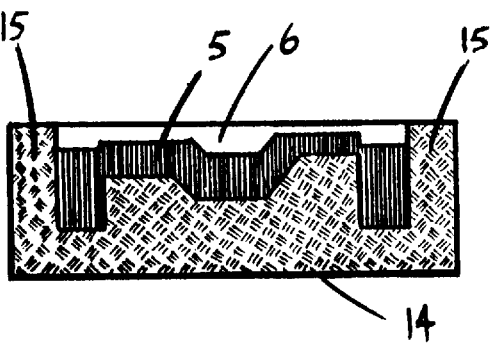
FIG. 10 is a schematic cross-sectional view of the assembly in FIG. 9 packed with elongated metal elements.
Figure 11:
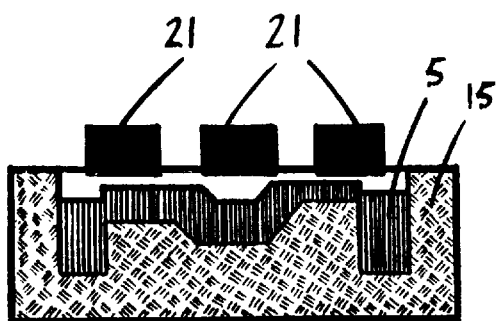
FIG. 11 is a schematic cross sectional view of the FIG. 10 assembly illustrating the placement of a low melting point metal infiltration agent on the top surface of the packed elongated metal elements.
Figure 12:
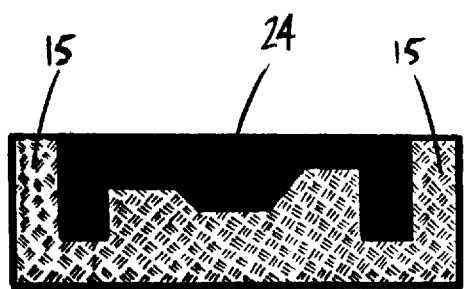
FIG. 12 is a schematic cross sectional view of the FIG. 11 assembly illustrating a solidified copy of the mould pattern shown in FIG. 7.
Figure 13:
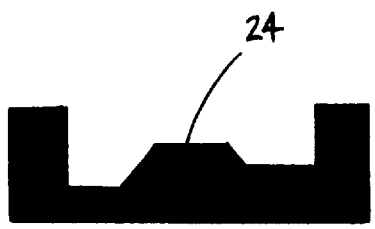
FIG. 13 is a schematic cross sectional view of the mould which includes a machining step to its base.

Referring in particular to FIG. 7 a mould pattern (12) is first made in the shape of the actual mould to be manufactured. The mould pattern (12) has a surface pattern (13) on one surface thereof which is placed facing upwardly on a bottom plate (3) and is enclosed in all sides by a walled enclosure (2) surrounding the mould pattern as shown in FIG. 8. The interior space (20) within the enclosure is filled with a ceramic slurry material and allowed to harden into a ceramic pattern (14) having a cavity (22) incorporating the reverse shape (23) of the surface pattern (13) on the mould pattern (12). The ceramic pattern (14) is next separated from the mould pattern (12) and has the shape schematically shown in FIG. 9 and, in particular, the walled feature (15) which surrounds the shaped cavity (22). FIG. 10 shows the step of packing the shaped cavity (22) with the elongated metal elements which step is analogous to the one earlier described with reference to FIG. 3. FIG. 11 illustrates the placement of a low melting point metal infiltration agent (21) on the surface of the elongated metal elements. The entire assembly is next placed in an oven where the metal infiltration agent is melted and allowed to permeate the spaces between the elongated metal elements. FIG. 13 illustrates the fully dense mould (24) so obtained when separated from the ceramic pattern (14). The fully dense mould (24) is a copy of the mould pattern (12) and incorporates the surface pattern (13).

The use of a metal flowable agent may also require the step of covering the surface of the ceramic pattern with a very thin layer of metal powders of the same or similar kind of metal as the elongated elements which has good wettability with the metal infiltration material before packing the elongated elements in the ceramic mould. This step assists in obtaining a more accurate mould for certain metal and infiltration material combinations.

The metal infiltration material may be in the form of block, chip, powder or particle. For elongated metal elements made from copper, tin based low melting point alloys such Sn—Bi alloy can be used. For steels, copper infiltration materials are suitable. The elongated metal elements may be coated with a material which is metallurgically compatible with the infiltration metal material to enhance the infiltration process. Inert coatings also reduce oxidation of the EME's during infiltration. For example, Sn—Bi infiltration material wets tin-coated copper wires very well, while Ni—P or Ni—B alloy coatings on steel wires facilitate infiltration of copper into the packed wires. A furnace (not shown) with flowing reducing gas ($H_2$) or inert gas such as Argon, is heated up to and kept at above the melting point of the infiltration material but lower than the melting point of the metal wires. The assembly is placed in the furnace and kept at the temperature for at least 3 hours. The infiltration material melts and flows into and fills the spaces between the elongated metal elements and underneath the bottom ends of the wires and the ceramic pattern critical surface. The furnace is then cooled down and the molten metal is allowed to solidify.

The ceramic slurry comprises refractory powders and a binder. The refractory materials can be chosen from plaster or oxides as commonly used in investment casting industry such as fused silica, zircon, alumina, and mullite. For the binder, water is used for plaster. For the oxide based refractory materials, colloidal based binders such as sodium silicate or hydrolysed ethyl silicate can be used. An example of a ceramic slurry comprises by weight (a) 40%—325 mesh fused silica, (b) 60% 30/50 mesh fused silica, 24 ml prehydrolysed ethyl silicate binder (containing 21% solid silica) per hundred grams of refractory, and 1 ml of 10% ammonium carbonate solution as a gelling agent for each 100 ml of ethyl silicate binder. The ceramic mould may be post-treated for further stabilisation and is fired in a furnace (not shown) at a temperature over 500° C. for at least 3 hours to remove absorbed water and other residual organic compounds that may have left in the mould to obtain an inert mould.

There can be many other applications for the invention. For example, this method can be applied to make abrasive wear-resistant parts where the flow of abrasive particles is mainly perpendicular to the axis of the elongated elements which can be made of highly wear resistant materials such as sintered carbides, white cast irons or ceramics.

Other process options involve applying vacuum or supplying an inert or reducing gases in the furnace to facilitate infiltration of the metal and prevent oxidation of metal components.

While particular embodiments of the present invention have been illustrated and described, it will be obvious to those who are skilled in the art that various changes and modifications may be made without departing from the spirit and scope of the present invention. It is intended to cover in the appended claims all such modifications that are within the scope of the invention.

What is claimed is:

1. A method of making a copy of an object having a surface pattern comprising:
   a) placing said object within a walled enclosure having a closed bottom and open top and orientating said surface pattern on said object to face upwardly within the enclosure;
   b) pouring a ceramic slurry material into said enclosure to make a ceramic pattern object having a shaped cavity incorporating a reverse copy of said surface pattern;
   c) separating said ceramic pattern object from said object;
   d) selecting a plurality of elongated metal rod elements each having a cross-section and opposite ends;
   e) vertically introducing a sufficient quantity of elongated metal rod elements to fill the said shaped cavity on said ceramic pattern, each said elongated metal rod element having one end in contact against the surface of said shaped cavity, and each said elongated metal element being in longitudinal abutment with adjacent elongated metal elements defining spaces therebetween;
   f) introducing an infiltration agent into said shaped cavity and allowing said agent to permeate said spaces;
   g) allowing said infiltration agent to solidify into a copy of said object and separating said copy of said object from said ceramic pattern object.

2. A The method as claimed in claim 1 wherein said step of introducing said infiltration agent is done in the presence of a vacuum.

3. The method as claimed in claim 2 wherein the melting point of said elongated metal rod elements is greater than the melting point of the infiltration agent.

4. The method as claimed in claim 3 wherein said infiltration agent is a liquid resin.

5. The method as claimed in claim 3 wherein said infiltration agent is a liquid resin containing a metal powder.

6. The method as claimed in claim 3 wherein said infiltration agent is molten metal.

7. The method as claimed in claims 4, 5, or 6 the cross-section of each of said elongated rod metal element is identical and wherein each said end is rounded.

8. The method as claimed in claim 7 wherein the cross-section of each of said elongated metal rod elements is round.

9. The method as claimed in claim 8 including the step of encasing said shaped cavity on said ceramic pattern object a metallic material prior to introduction of the elongated metal rod elements.

10. The method as claimed in claim 9 including the step of machining tooling surfaces on the said object.

11. A method of making an object having a surface which is an obverse copy of a surface pattern on a second object comprising:
   (a) placing said second object within a walled enclosure having a closed bottom and open top and orientating the surface pattern on said second object to face upwardly within the enclosure;
   (b) selecting a plurality of elongated metal rod elements each having a cross section and opposite ends;
   (c) vertically introducing a sufficient quantity of elongated metal rod elements into said enclosure to fill said enclosure, each said elongated metal element having one end in contact against said surface pattern or bottom, each said elongated metal element being in longitudinal abutment with adjacent elongated metal elements defining spaces therebetween;
   (d) introducing a liquid resin infiltration agent into said enclosure over said elongated metal elements, said elongated metal elements having a melting point greater than the melting point of the infiltration agent, and allowing said infiltration agent to permeate said spaces;
   (e) allowing said infiltration agent to solidify into an object and separating said object comprising said plurality of elongated metal elements from said pattern and said enclosure.

12. The method as claimed in claim 11, wherein said step of introducing said infiltration agent is done in the presence of a vacuum.

13. The method as claimed in claim 11, wherein said second object is made of a ceramic material.

14. The method as claimed in claims 11, wherein the cross-section of each of said elongated metal rod elements is identical and wherein each said end is rounded.

15. The method as claimed in claim 11, wherein the cross-section of each of said elongated metal rod elements is round.

16. The method as claimed in claim 11, including the step of encasing said surface pattern on said second object in a metallic material prior to introduction of the elongated metal rod elements.

17. The method as claimed in claim 11 including the step of machining surfaces on the said object.

18. The method as claimed in claim 11, said liquid resin infiltration agent contains metal powder.

19. A method of making an object having a surface which is an obverse copy of a surface pattern on a second object comprising:
   (a) placing said second object within a walled enclosure having a closed bottom and open top and orientating the surface pattern on said second object to face upwardly within the enclosure;
   (b) selecting a plurality of elongated metal rod elements each having a cross section and opposite ends;
   (c) vertically introducing a sufficient quantity of elongated metal rod elements into said enclosure to fill said enclosure, each said elongated metal element having one end in contact against said surface pattern or bottom, each said elongated metal element being in longitudinal abutment with adjacent elongated metal elements defining spaces therebetween;
   (d) introducing an infiltration agent into said enclosure over said elongated metal elements, said infiltration agent being a liquid resin containing a metal powder, said elongated metal elements having a melting point greater than the melting point of the infiltration agent, and allowing said infiltration agent to permeate said spaces;
   (e) allowing said infiltration agent to solidify into an object and separating said object comprising said plurality of elongated metal elements from said pattern and said enclosure.

20. The method as claimed in claim 19, wherein said step of introducing said infiltration agent is done in the presence of a vacuum.

21. The method as claimed in claim 19, wherein said second object is made of a ceramic material.

22. The method as claimed 19, in claims wherein the cross-section of each of said elongated metal rod elements is identical and wherein each said end is rounded.

23. The method as claimed in claim 19, wherein the cross-section of each of said elongated metal rod elements is round.

24. The method as claimed in claim 19, including the step of encasing said surface pattern on said second object in a metallic material prior to introduction of the elongated metal rod elements.

25. The method as claimed in claim 19 including the step of machining surfaces on the said object.

* * * * *